(12) United States Patent
Letang

(10) Patent No.: US 9,453,492 B2
(45) Date of Patent: Sep. 27, 2016

(54) FLUID-DRIVEN POWER GENERATING APPARATUS

(71) Applicant: Kyli Irene Letang, Las Vegas, NV (US)

(72) Inventor: Kyli Irene Letang, Las Vegas, NV (US)

( * ) Notice: Subject to any disclaimer, the term of this patent is extended or adjusted under 35 U.S.C. 154(b) by 86 days.

(21) Appl. No.: 14/481,967

(22) Filed: Sep. 10, 2014

(65) Prior Publication Data

US 2014/0375059 A1     Dec. 25, 2014

Related U.S. Application Data

(62) Division of application No. 13/622,830, filed on Sep. 19, 2012, now Pat. No. 8,928,168.

(51) Int. Cl.
*F03B 13/00* (2006.01)
*H02P 9/04* (2006.01)
*F03B 17/00* (2006.01)

(52) U.S. Cl.
CPC .............. *F03B 13/00* (2013.01); *F03B 17/005* (2013.01); *F05B 2210/10* (2013.01); *F05B 2220/20* (2013.01); *Y02E 10/20* (2013.01); *Y10S 415/916* (2013.01)

(58) Field of Classification Search
CPC ........ F03B 13/10; F03B 7/00; F03B 17/005; F03B 2220/20; F03B 2210/10; F03B 13/00; Y02E 10/223; Y02E 10/20; Y10S 415/916
USPC ....... 290/54, 55, 43, 53, 44, 42; 415/66, 916
See application file for complete search history.

(56) References Cited

U.S. PATENT DOCUMENTS 9,036,765 B2 *  5/2015  Birnbach ................. G21B 1/03
                                                    376/105

* cited by examiner

*Primary Examiner* — Javaid Nasri

(57) ABSTRACT

A fluid-driven power generating apparatus is a power generator in form pipes with either water wheels or balls with circumferential indents rotating therewithin. The water wheels or the balls are rotated by the fluid flow within the pipes. Each of the water wheels or each the balls has a wheel axle or a ball wheel axle which is encircled by a metal coil. Each metal coil is rotated by the fluid flow within a magnetic field produced by the electromagnetic layer attached to each of the pipes. Through the rotations of the metal coil within the magnetic field, electricity is thus created and stored in an energy storage device. Another variation of the present invention is a closed-system fluid-driven power generating apparatus with mercury as the driving fluid. The present invention can be incorporated into plumbing, dip, sprinkler systems as well as watercrafts such as ships, submarines, jet skis, etc.

9 Claims, 13 Drawing Sheets

Detail A

FLUID-DRIVEN POWER GENERATING APPARATUS

The current application is a division of U.S. Utility patent application Ser. No. 13/622,830 filed on Sep. 19, 2012, now U.S. Pat. No. 8,928,168.

FIELD OF THE INVENTION

The present invention relates generally to an electric generator. Specifically, the present invention is a fluid-driven power generating apparatus consisted of pipes and water wheels or balls with circumferential indents. The present invention comprises three embodiments wherein the first embodiment and the second embodiment are fluid-driven power generating consisted of pipes and water wheels or balls with circumferential indents. Both the first embodiment and the second embodiment require external fluid flows to generate electricity. Both the first embodiment and the second embodiment of the present invention may be incorporated into household plumbing, drip, and sprinkler systems. Moreover, the first embodiment and the second embodiment of the present invention may be incorporated into water crafts or water vehicles such as submarines, boats, ships, jet skis, etc. Similar to the first embodiment and the second embodiment, the third embodiment also comprises either water wheels or balls with circumferential indents. However, unlike the first embodiment and the second embodiment, which are open-system pipes that are powered by external fluid flows, the third embodiment of the present invention is a closed-system mercury-driven power generating apparatus, which is powered by internal fluid flows to generate electricity. The third embodiment of the present invention may be integrated to any structure such as the interior of a ship, a submarine, or a building.

BRIEF DESCRIPTION OF THE PRIOR ART

Although there exists prior art that implement similar theories involving hydroelectricity, the fluid-driven power generating apparatus still retains its uniqueness. Unlike Vipond's GB 2451632 UK patent for the Turbine Mounted in Water Supply Pipe, the present invention makes use of an inverted solenoid (magnetic) technology to generate current. The present invention uses a coil that spins within a magnetic field to generate the electricity needed. Also, the present invention is comprised of multiple water wheels within pipes as opposed to only one water wheel contained within the water wheel containing device in the prior art. The present invention may be installed to replace current traditional household pipes since the dimensions of the pipes in the present invention can match the dimensions of traditional household pipes. Unlike the present invention, the prior art is not easily integrated into traditional household piping system since the prior art is bulky. Furthermore, the prior art can only be installed at the entrance of each pipe, whereas the present invention can be installed in any location within the plumbing system.

Another prior art that shows some similarities at the surface to the present invention. The prior art World Intellectual Property Organization WO 2010/120202 A1, the Bathwater Reusing System Driven By Supply Water Pressure, has several distinct differences. While both use hydraulic energy produced by water in pipes, their scope and purpose differ. In the prior art, all components are incorporated into standard pipes whereas the first embodiment and the second embodiment of the present invention provides a new and innovative pipe design which uses a series of chambers to incorporate water wheels in a setting where maximum efficiency is achieved. The present invention is consisted of water wheels or balls, which are small hydraulic turbines rotated inside a magnetic field created by stationary electromagnets, whereas the prior art is also consisted of a hydraulic turbine, which instead is rotated outside the magnetic field. Unlike sheathing the turbines or water wheels in the present invention, the magnetic field created is situated on the inside of the hydraulic turbine since the metal coil and electromagnets are located on the inside of the hydraulic turbine in the prior art. There is also a significant difference of how the energy is used once it has been generated. The present invention has the capacity to store energy in a consolidated energy storage device and the ability to distribute it to the rest of a household or a water vehicle. In a water-based vehicle, the movement of the water-based vehicle in water will power the present invention whose generated electricity can be used to supplementarily power the water vehicle. Moreover, the present invention may also distribute the stored energy to the rest of a structure if the closed-system mercury embodiment was to be implemented. The power generated in the closed-system mercury embodiment may be sold back partially or fully to the electrical grid by the user. Unlike the present invention, the prior art is unable to store energy. Furthermore, the prior art solely functions as an apparatus to pump recovered bathwater.

BACKGROUND OF THE INVENTION

The present invention is a fluid-driven electric power generating apparatus designed to convert kinetic energy of flowing fluid in a pipe to electric energy, which is used to power a house, a water vehicle, a sprinkler system, or an irrigation system. The electrical power produced in the present invention does not need to be stored in an energy storage, but the produced power may be sold back partially or fully to the electrical grid. Once installed into a household plumbing system, the present invention can generate supplementary electricity that can reduce annual energy costs. The present invention utilizes electromagnetism to produce the electric energy. In the present invention, a metal coil is wrapped around an axle of a water wheel or a ball, and is rotated once the water wheel or ball is rotated by the fluid flow in the pipe. The pipe is covered in an electromagnetic layer wherein the metal coil rotates. As a result, electricity is generated and stored in an energy storage device. The energy storage device such as a battery may be attached to each pipe of the apparatus or be safely stored in a larger collective storage device, which can be situated in the garage, the attic, the basement, and other safe places of a house.

The present invention comprises three embodiments wherein the first embodiment is an open-system with a plurality of water wheels rotating inside a plurality of pipes. The second embodiment is similar to the first embodiment except the plurality of water wheels has been replaced by a plurality of balls with circumferential indents. The circumferential indents on each of the plurality of balls serves to contact the inflow fluid in the same manner as the plurality of wheel paddles in the first embodiment. Both the first embodiment and the second embodiment are open-system apparatuses using water as the driven fluid. The third embodiment is similar to both the first embodiment and the second embodiment, but the third embodiment is a closed-system apparatus instead of an open-system apparatus. Specifically, the third embodiment is driven by liquid mercury and comprises a mercury core, which houses an oscillator. The oscillator rotates and circulates the liquid mercury throughout the apparatus in the third embodiment, so all liquid mercury in the apparatus is recycled and continually generating electric power in the process.

DETAILED DESCRIPTION OF THE INVENTION

All illustrations of the drawings are for the purpose of describing selected versions of the present invention and are not intended to limit the scope of the present invention.

Figure 5:
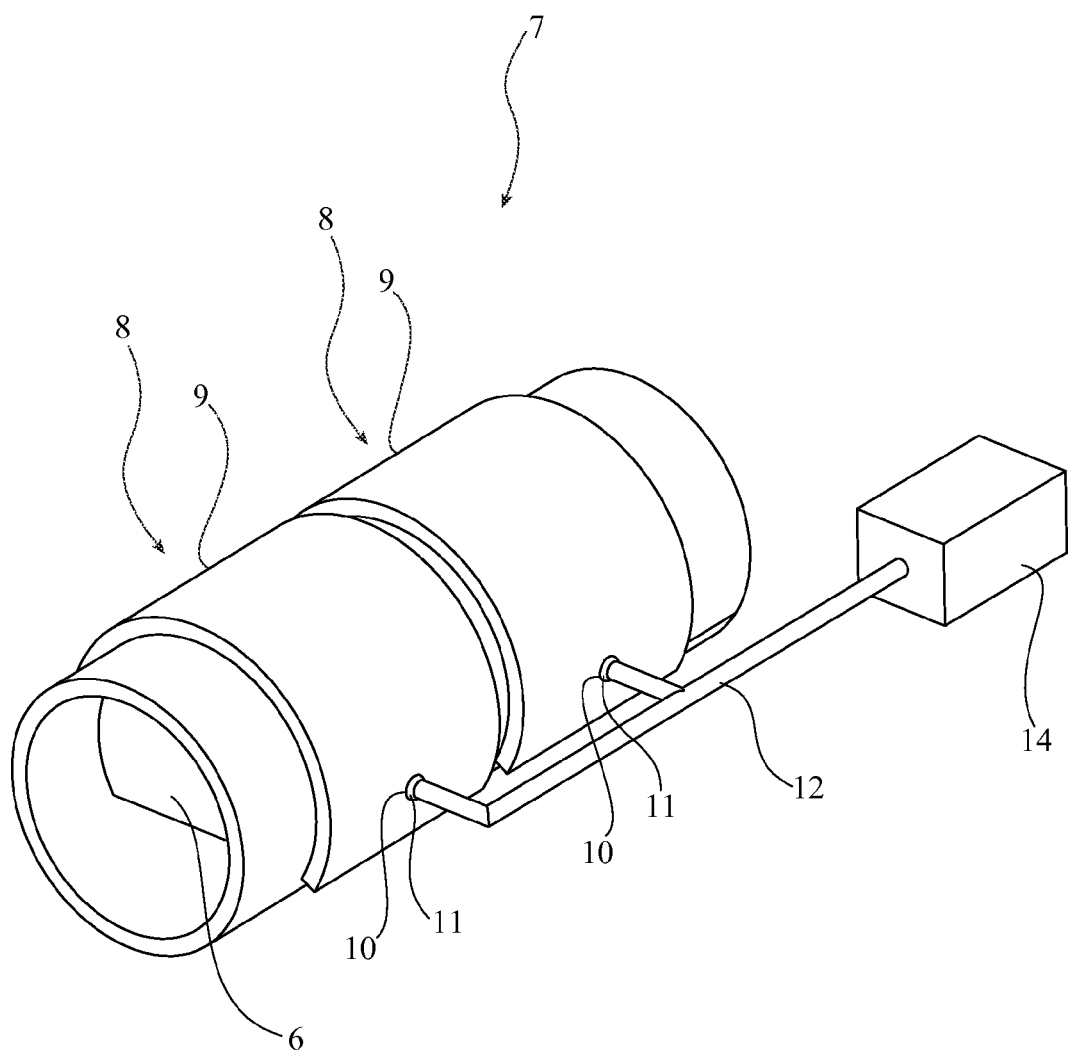
FIG. 5 is a perspective view of the first embodiment of the present invention.
Figure 6:
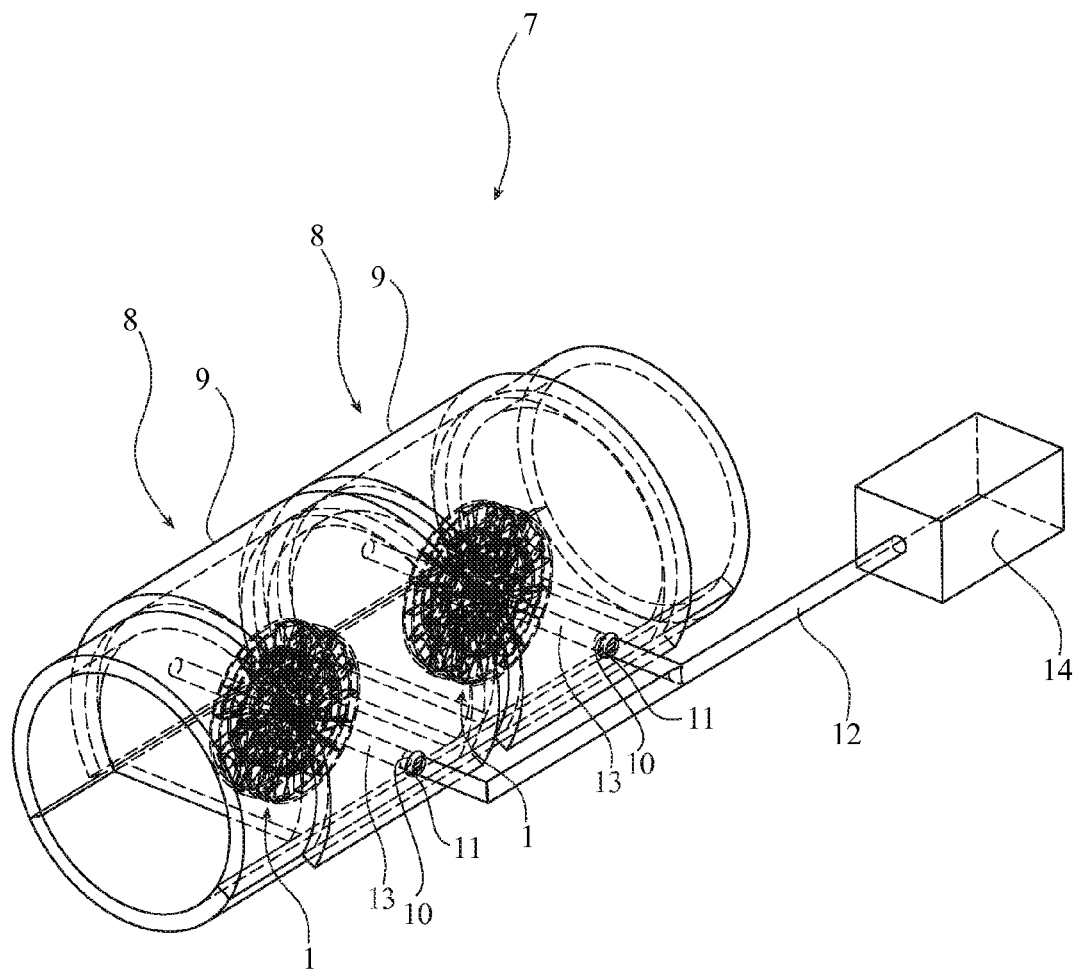
FIG. 6 is a transparent perspective view of the first embodiment of the present invention with the water wheels residing inside.
Figure 9:
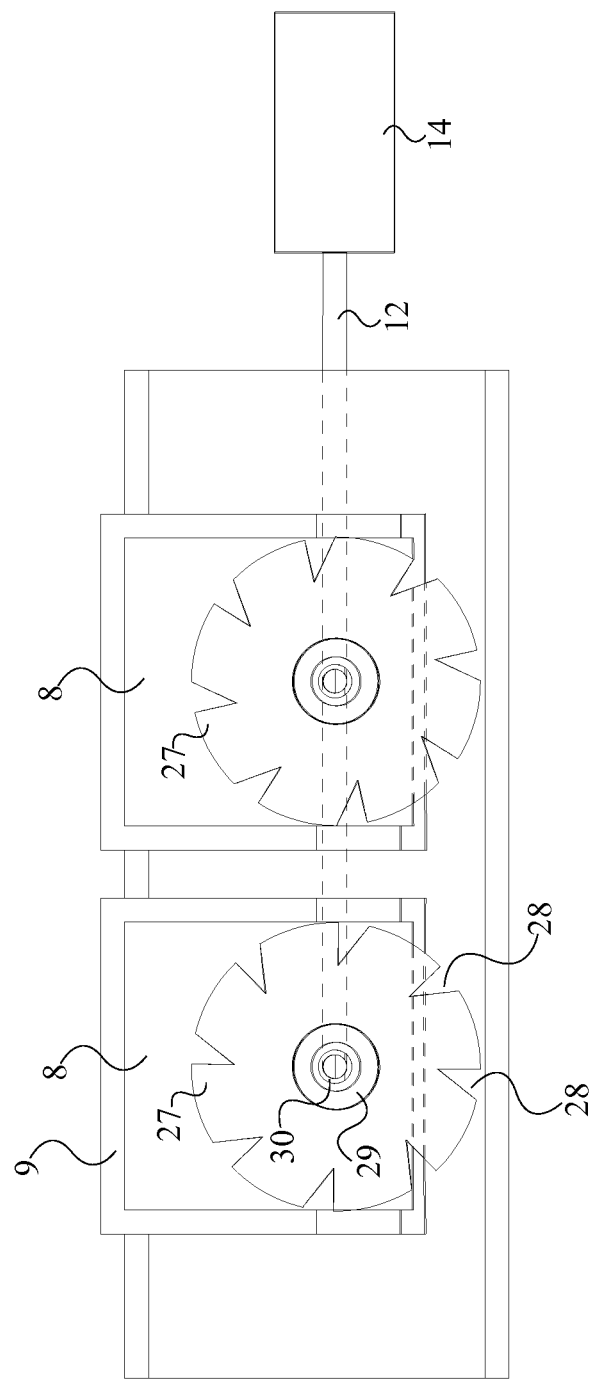
FIG. 9 is a cross-sectional view of the second embodiment of the present invention.
Figure 10:
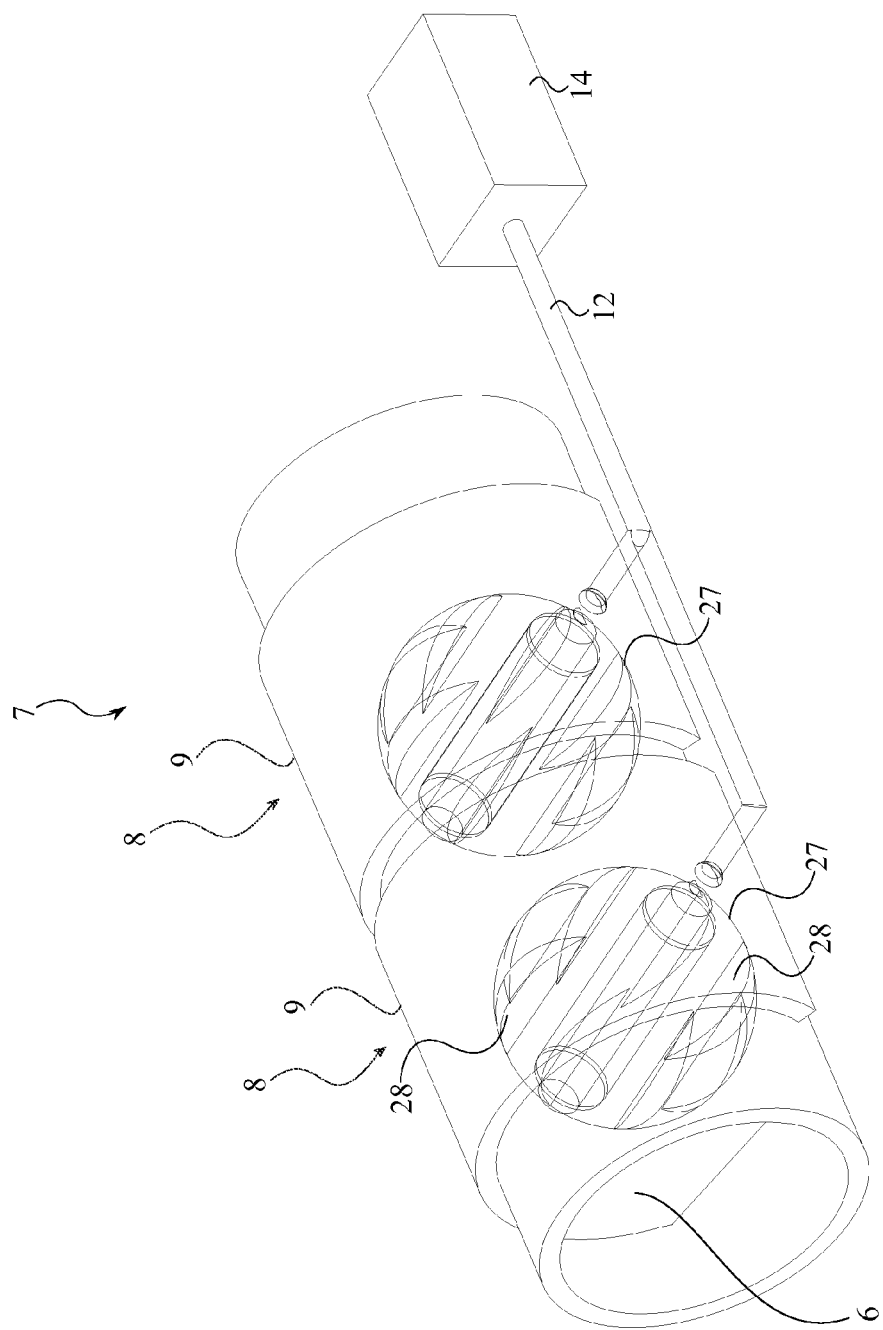
FIG. 10 is a transparent perspective view of the second embodiment of the present invention.
Figure 11:
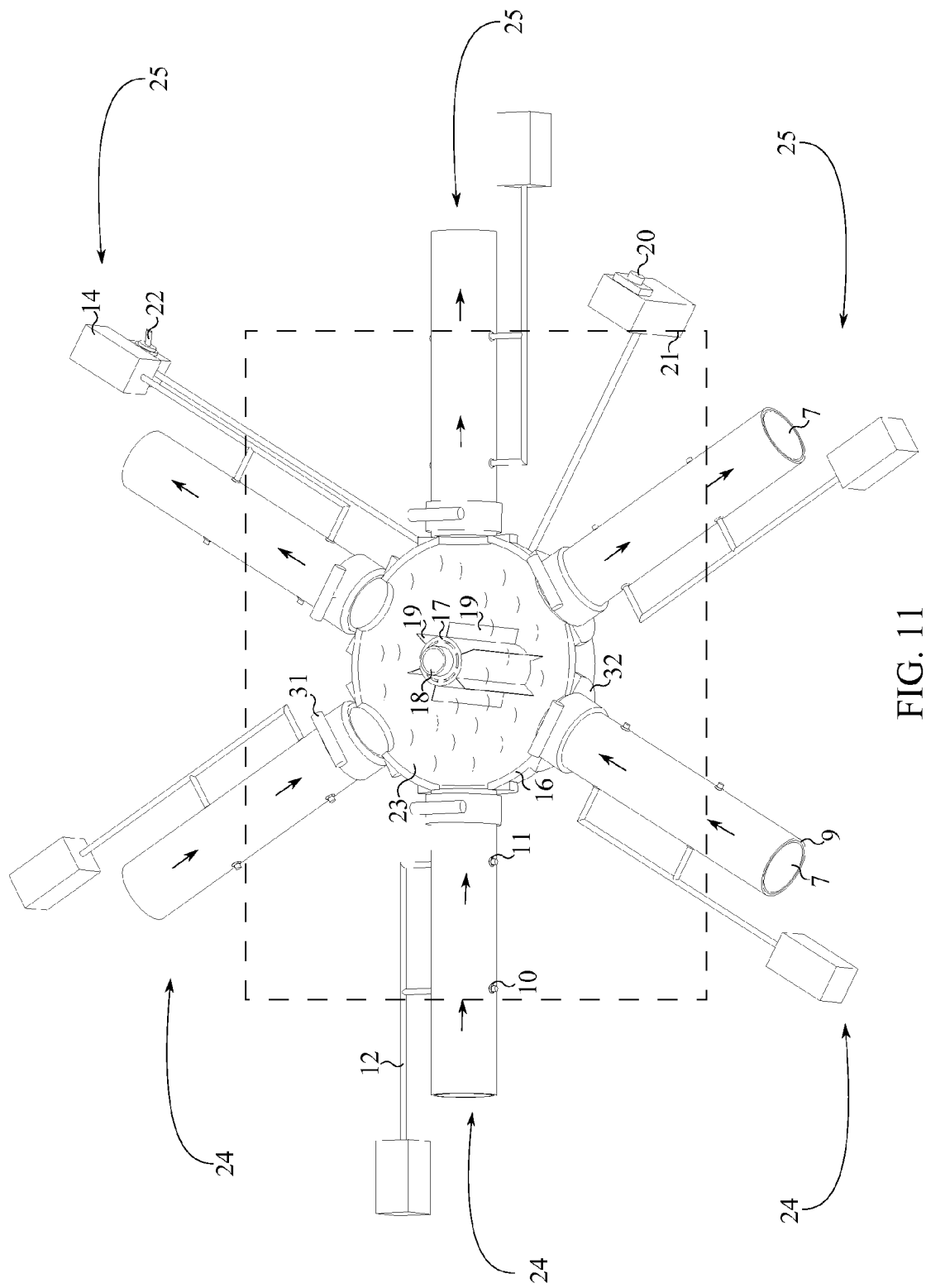
FIG. 11 is a perspective view of the third embodiment of the present invention.
Figure 12:
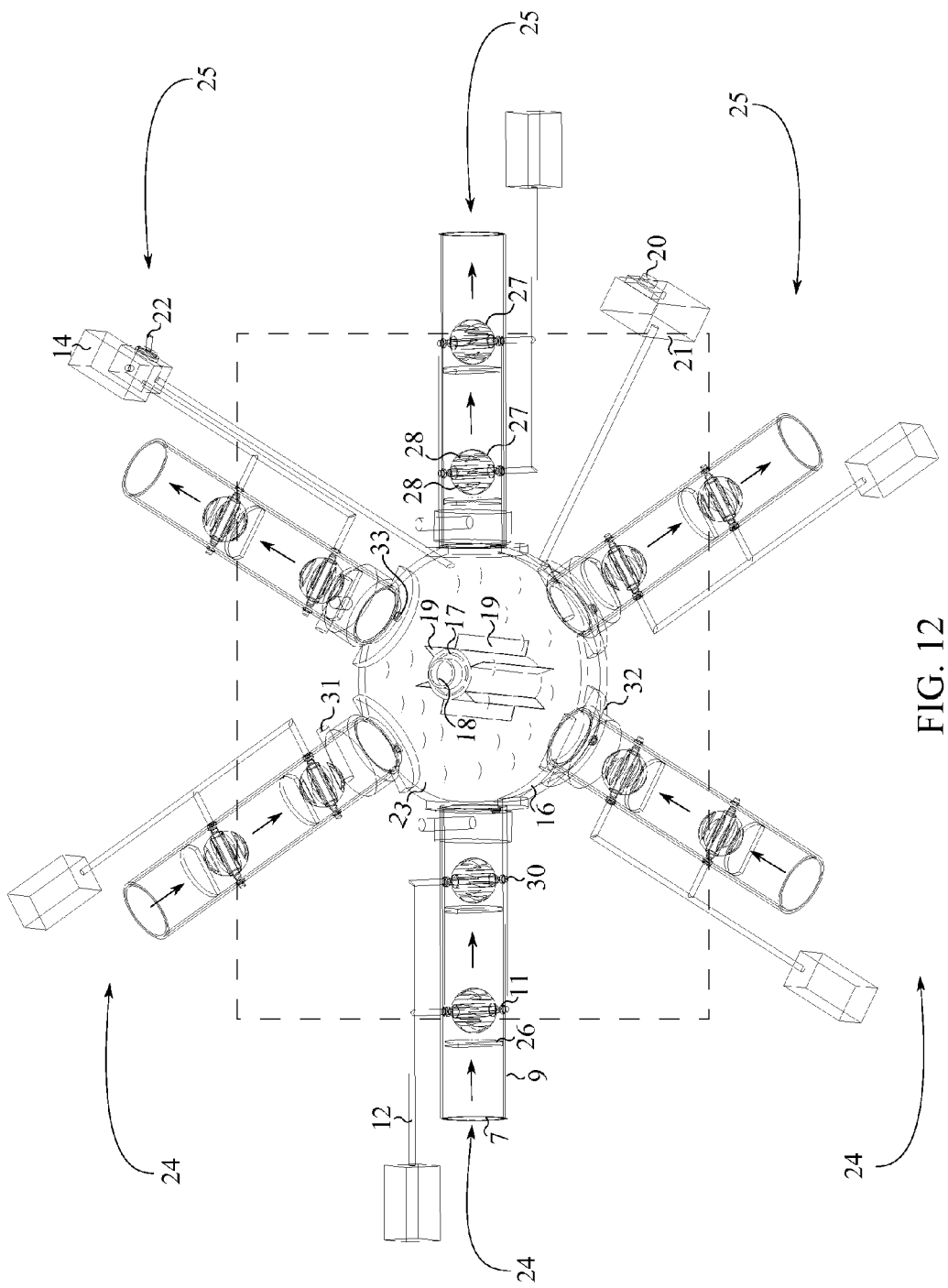
FIG. 12 is a transparent perspective view of the third embodiment of the present invention.
Figure 13:
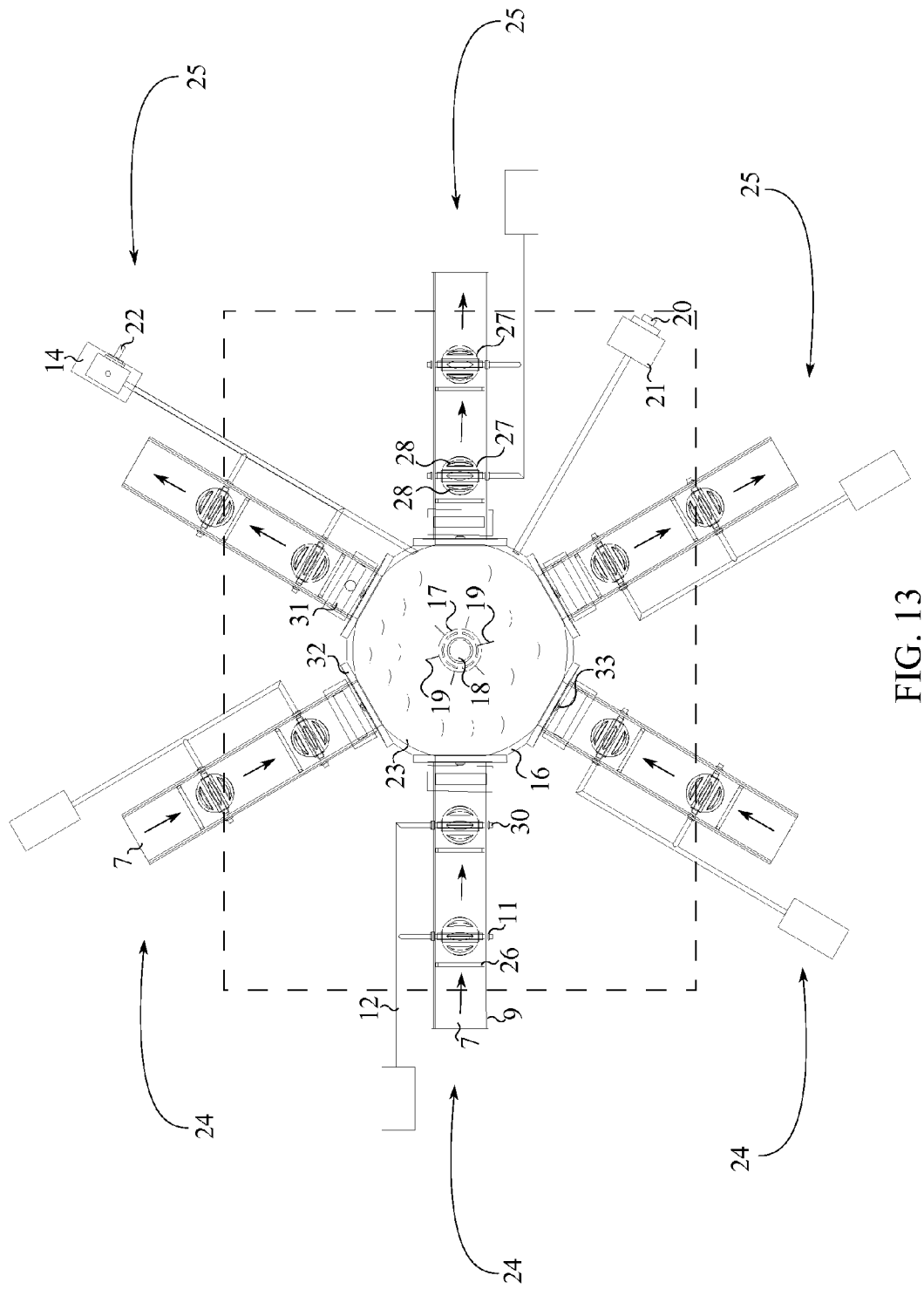
FIG. 13 is a transparent top view of the third embodiment of the present invention.

The fluid-driven power generating apparatus relies on fluid pressure to provide the hydraulic head necessary to spin either a plurality of water wheels 1 or a plurality of balls 27 located within each of a plurality of pipes 7. This method of power generation does not have any associated environmental side effects that are often true for larger power generation undertakings such as building a dam or rerouting bodies of water. The present invention comprises three embodiments. The first embodiment is the plurality of pipes 7 each comprising a plurality of chambers 8 and an energy storage device 14 as shown in FIG. 5 and FIG. 6. The present invention may optionally comprise the energy storage device 14 as the stored energy may be sold back to the electrical grid by the building or home owner. The plurality of chambers 8 are attached to each of the plurality of pipes 7. As shown in FIG. 6, each of the plurality of chambers 8 comprises each of the plurality of water wheels 1, a pipe hole 10, and wire housing 12. The second embodiment is similar to the first embodiment except the plurality of water wheels 1 has been replaced by the plurality of balls 27, wherein each of the plurality of balls 27 comprising a plurality of indents 28. The second embodiment is shown in FIG. 9 and FIG. 10. The third embodiment is a closed system fluid-driven power generating apparatus comprising the plurality of pipes 7, which are radially connected to a mercury core 16. The mercury core 16 houses an oscillator. Furthermore, the third embodiment is fluid-driven by a liquid mercury 23 instead of water. The third embodiment is illustrated in FIG. 11, FIG. 12, and FIG. 13.

The first embodiment and the second embodiment are a hydroelectric power generation apparatus. Unlike the third embodiment, the first embodiment and the second embodiment use water to generate electricity. The plurality of water wheels 1 or the plurality of balls 27 has been mounted and housed within each of the plurality of pipes 7. The plurality of water wheels 1 or the plurality of balls 27 has been mounted in such a manner wherein the plurality of water wheels 1 or the plurality of balls 27 may be rotated and spun by the moving water within each of the plurality of the pipes. The plurality of water wheels 1 or the plurality of balls 27 may be used under water falls or in any flowing stream of fluid to create electricity. Attached to each of the plurality of pipes 7 is the energy storage device 14. With the first embodiment and the second embodiment of the present invention, individual home owners can decide how much energy they want to generate by installing the plurality of pipes 7 to increase the electrical generation capacity.

Referring to FIG. 5 and FIG. 6, each the plurality of pipes 7 used to house the plurality of water wheels 1 has several defining components which differentiate the plurality of pipes 7 from conventional pipes. Each of the plurality of chambers 8 is used to house each of the plurality of water wheels 1 or each of the plurality of balls 27. Additionally, each of the plurality of chambers 8 comprises an electromagnetic layer 9 and a wheel guard 6. The electromagnetic layer 9 is positioned atop each of the plurality of chambers 8, whereas the wheel guard 6 is positioned perpendicularly within each of the plurality of chambers 8. The perpendicular position of the wheel guard 6 within each of the plurality of chambers 8 is to prevent the fluid flow from flowing over each of the plurality of water wheels 1. The wheel guard 6 forces all the incoming fluid to flow under each of the plurality of water wheels 1 to generate a higher fluid pressure, which forces each of the plurality of water wheels 1 to be spun at a faster rate. Each of the plurality of chambers 8 has a diameter greater than that of each of the plurality of pipes 7 to accommodate each of the plurality of water wheels 1 or each of the plurality of balls 27 within thereof. Each of the plurality of chambers 8 accommodates roughly half of each of the plurality of water wheels 1. Specifically, the chamber accommodates the majority of each of the plurality of water wheels 1 with only approximately ⅓ of the radius of each of the plurality of water wheels 1 exposed. The uncovered area of each of the plurality of water wheels 1 controls the area of contact the water has on each of the plurality of water wheels 1 to ensure that each of the plurality of water wheels 1 spin in the desired direction. If an abundance of the surface area is exposed to the flowing water, each of the plurality of water wheels 1 will not be able to turn in the desired direction. In the second and third embodiments, the plurality of water wheels 1 is replaced by the plurality of balls 27 with each comprising circumferential indents to catch the inflow of water. The plurality of indents 28 may be of any concave shape or form. Each of the plurality of chambers 8 also comprises the wheel guard 6 which is perpendicularly positioned to the flow of the water. As shown in FIG. 5 and FIG. 10, the wheel guard 6 is positioned anterior to each of the plurality of water wheels 1 or each of the plurality of balls 27 to reduce the exposure of inflow upon each of the plurality of water wheels 1 or each of the plurality of water wheels 1. Thus, the wheel guard 6 constricts the inflow, which contacts each of plurality of water wheels 1 or each of the plurality of balls 27 with greater inflow pressure. In the first embodiment and the second embodiment, the wheel guard 6 has been designed to fit within each of the plurality of pipes 7 leaving a small gap between each of the plurality of water wheels 1 or each of the plurality of balls 27 and each of the plurality of pipes 7 to allow some water to pass through completely undisturbed. The small gap between each of the plurality of water wheels 1 or each of the plurality of balls 27 and each the plurality of pipes 7 is optional as some variations of the present invention do not allow the water to go through without moving a well or a ball to increase electric production. Each of the plurality of water wheels 1 function in a similar way to an undershot water wheel, where the water needs to hit the bottom oriented portion to spin the wheel. Water that gets caught in each of the plurality of water wheels 1 will subsequently be pushed out by each of the plurality of water wheels 1 as each of the plurality of water wheels 1 continues to spin around, so that no water is being wasted in each of the plurality of pipes 7.

Again referring to FIG. 5 and FIG. 6, mounted along the outside of each of the plurality of chambers 8 is the electromagnetic layer 9. The electromagnetic layer 9 is essentially a sheet created out of electromagnets. The electromagnetic layer 9 can either be turned on or off, depending on whether or not the user wants to generate electricity.

Referring to FIG. 5 and FIG. 6, another design feature of each of the plurality of pipes 7 is the pipe hole 10 on the surface of each of the plurality of chambers 8 and the surface of each of the plurality of pipes 7. Furthermore, the pipe hole 10 traverses laterally through each of the plurality of the chambers and each of the plurality of pipes 7. The pipe hole 10 is closed with a threaded corked screw 11 to secure the pipe hole 10 against the pressure of the water inside each of the plurality of pipes 7 and each of the plurality of chambers 8. The threaded corked screw 11 is insulated on the edges to prevent the loss of water through the pipe hole 10. Furthermore, the threaded corked screw 11 with insulation serves as a rubber stopper to prevent the water from leaking out of the pipe hole 10. The threaded corked screw 11 joins each of the plurality of chambers 8 and the wire housing 12 together. Therefore, the threaded corked screw 11 is positioned on the wire housing 12, at the pipe interface. Then, the wire housing 12 connects each of the plurality of water wheels 1 to the energy storage device 14. Consequently, the wire housing 12 is connected to the energy storage device 14. The wire housing 12 is insulated to ensure that the wires are safe from the water in each of the plurality of pipes 7. Therefore, the wire housing 12 also traverses through the pipe hole 10. The pipe hole 10 also acts as an entry point to do minor repairs or to upkeep the inside of each of the plurality of pipes 7 and each of the plurality of water wheels 1 or each of the plurality of balls 27 therein. All the created power from the plurality of water wheels 1 or the plurality of balls 27 may go to the energy storage device 14 to be stored for later uses. Moreover, the attachment of the energy storage device 14 to the present invention and the system ensures a safe steady flow of power through the rest of the electrical circuit of the house with no power surges and shortages.

The plurality of pipes 7 can be manufactured from an assortment of materials such as copper and plastic, which are commonly used in current plumbing fixtures. Any material which is non toxic and capable of supporting the hydroelectric in-house piping apparatus against the flow of the incoming water would suffice. Both plastic and metal pipes are both safe for being in water for the materials of the pipes are more likely to withstand hydrostatic pressure once submerged in water. Due to the strong composition of the materials, both of the plastic and metal pipes are less likely to lose structural integrity under water.

As shown in FIG. 6, the plurality of water wheels 1 is designed to be installed in each of the plurality of pipes 7 which transport incoming water to the house. This design specification is due to the nature of the outgoing water containing solid substances that could potentially clog the plurality of water wheels 1 or the plurality of balls 27 and subsequently the plurality of pipes 7. Outgoing water is normally composed of grey and black water, which carries solid substances therein. The installation of the plurality of pipes 7 which carries out grey and black water would have to be carefully selected. Possible candidates include water from the dishwasher and washing machine. It is also conceivable to apply the first embodiment and the second embodiment to other sources of flowing water, such as a gutter or sprinkler system. The plurality of water wheels 1 or the plurality of balls 27 installed in a timed sprinkler system would be able to generate electricity when the user is not at home and store the electricity for later uses. While the gutter system would be able to generate electricity during heavy rain and storms, water catching devices can also be added to the roof and thereby converting the gutter system to a water collection system.

Figure 2:
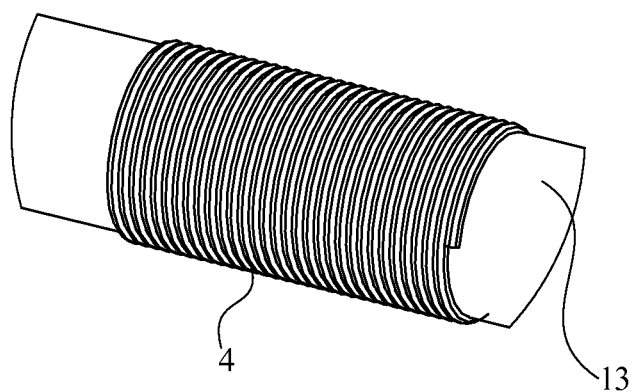
FIG. 2 is a detailed view of the metal coil.
Figure 3:
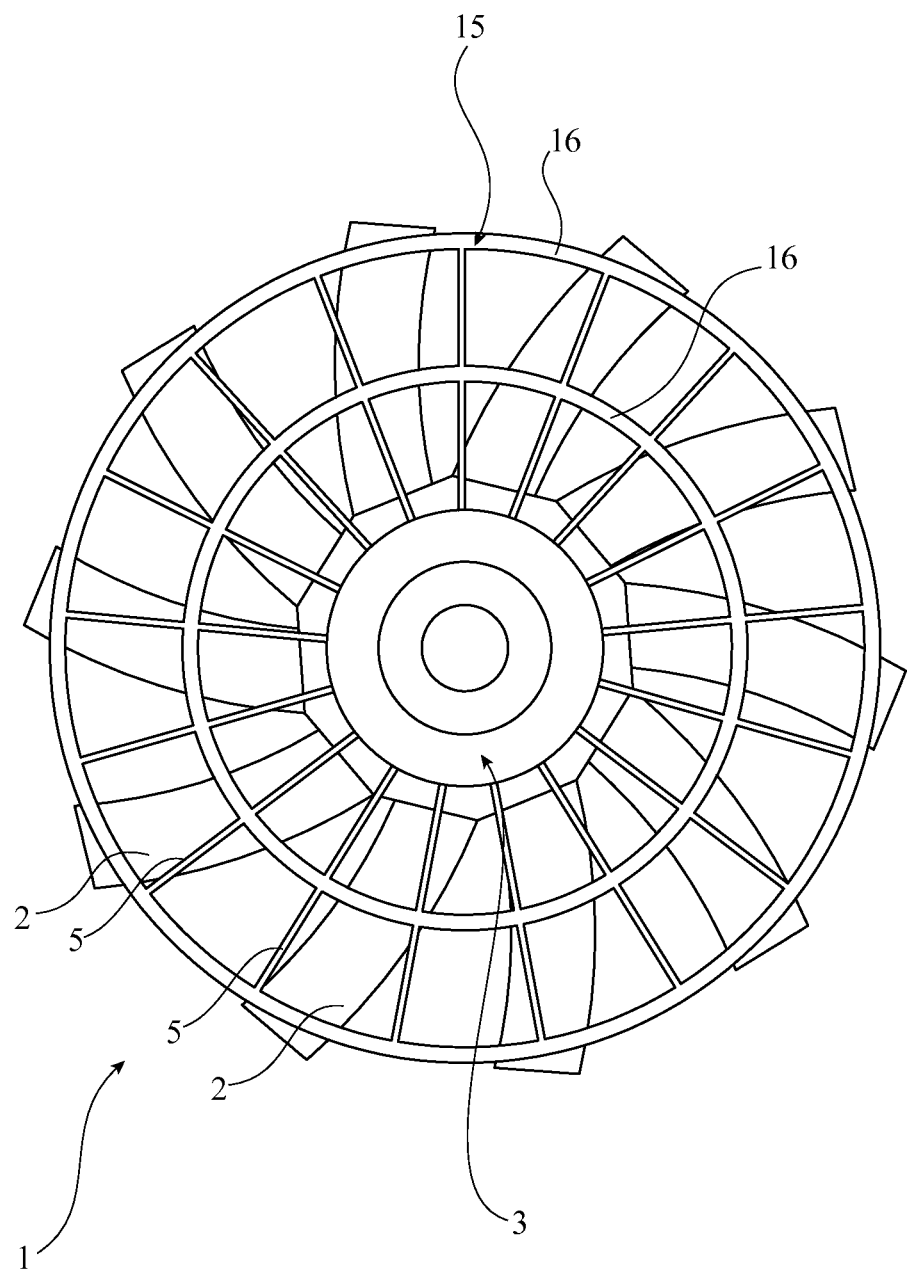
FIG. 3 is a lateral view of each of a plurality of water wheels.
Figure 4:
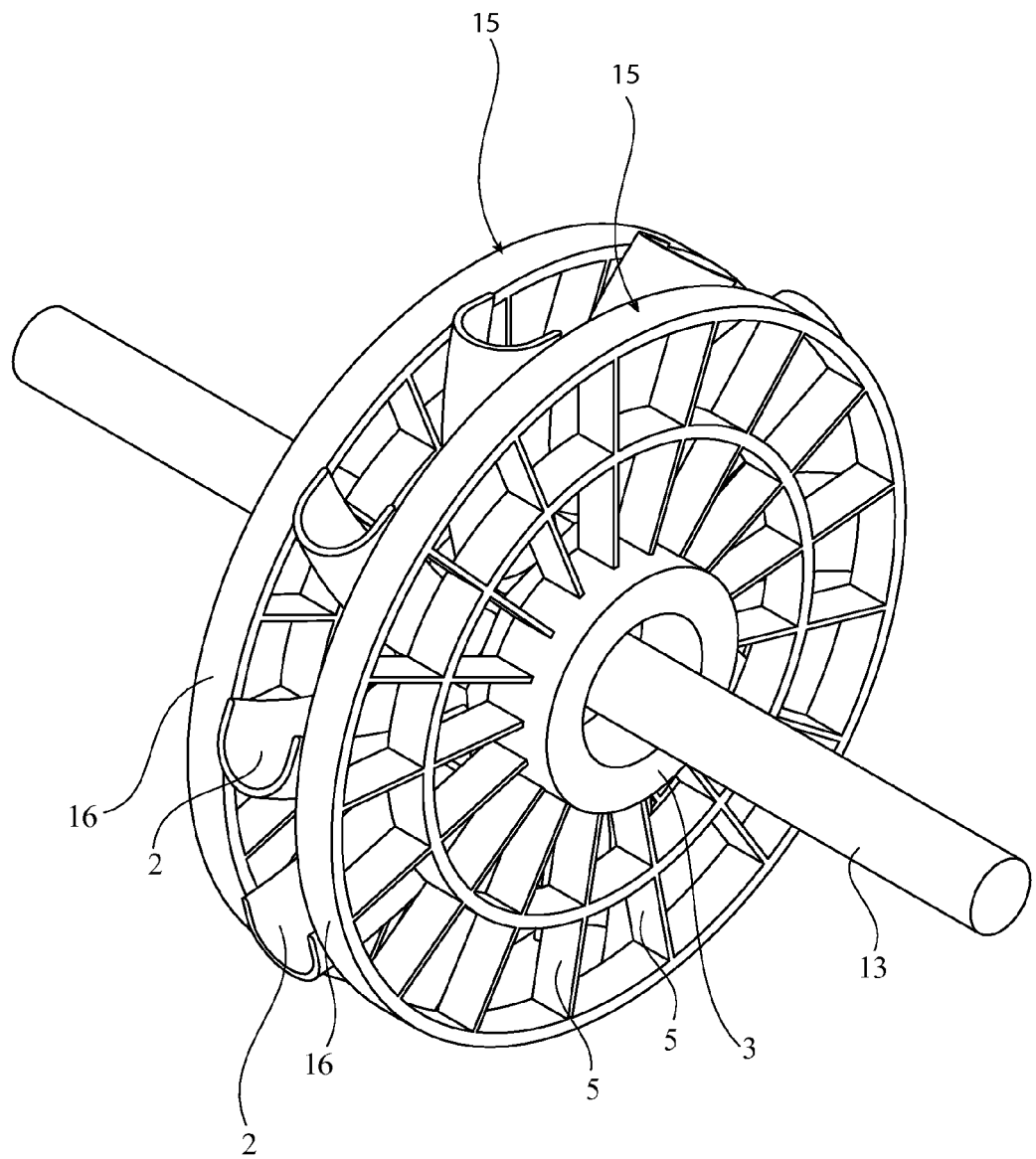
FIG. 4 is a perspective view of each of the plurality of water wheels with the wheel axle.

In reference to FIG. 2, FIG. 3, and FIG. 4, each of the plurality of water wheels 1 contains a wheel axle 13, a wheel center 3, a plurality of wheel support systems 15, and a plurality of wheel paddles 2. The wheel center 3 centrally traverses through each of the plurality of water wheels 1. The plurality of wheel paddles 2 are able to catch the water that is flowing below each of the plurality of water wheels 1 while the plurality of wheel paddles 2 radially protrudes out from the wheel center 3. Specifically, the plurality of wheel paddles 2 being radially connected to the wheel center 3. The plurality of wheel paddles 2 is also attached to each of the plurality of wheel support systems 15. Each of the plurality of wheel support systems 15 is laterally attached to both sides of the plurality of wheel paddles 2. Alternatively, the plurality of wheel paddles 2 has each of the plurality of wheel support systems 15 attached laterally on both sides thereof as shown in FIG. 4. Similar to the plurality of wheel paddles 2, each of the plurality of wheel support systems 15 is also attached to the wheel center 3. As illustrated in FIG. 4, each of the plurality of wheel support systems 15 comprises a plurality of support rings 16 and a plurality of spokes 5. Each of the plurality of support rings 16 is concentrically positioned with the wheel center 3. Therefore, the plurality of support rings 16 and thus the plurality of wheel support systems 15 are all concentrically positioned with the wheel center 3. Positioned radially outward from the wheel center 3 on each side of each of the plurality of water wheels 1 is the plurality of support rings 16. Subsequently, each of the plurality of support rings 16 possesses a larger diameter than the previous ring. Connecting all the plurality of support rings 16 together on each of the plurality of wheel support systems 15 is the plurality of spokes 5, which is positioned perpendicularly to the plurality of support rings 16. Furthermore, the plurality of spokes 5 is also positioned on the same plane with the plurality of support rings 16. The plurality of support rings 16 is all connected to the plurality of spokes 5. The plurality of support rings 16 is aligned atop the wheel center 3, on both sides of the plurality of wheel paddles 2. Particularly, the plurality of spokes 5 helps stabilize the concentric positions of the plurality of the support rings around the wheel center 3 by connecting to the plurality of support rings 16 to the wheel center 3. The plurality of wheel support systems 15 also helps attach the plurality of wheel paddles 2 to the wheel center 3 to ensure that each of the plurality of water wheels 1 and the plurality of wheel paddles 2 remain intact.

The pressure due to the combination of the size of the opening of each of the plurality of pipes 7 and the wheel guard 6 causes the water to enter at a high enough velocity to push the plurality of water wheels 1 into rotational motion. The direction of the plurality of water wheels 1 is dependent solely on the direction of water. Since the plurality of wheel paddles 2 is concave up and facing toward the direction of water flow, the plurality of wheel paddles 2 is angled toward the headwater, which is water entering each of the plurality of pipes 7, as opposed to the tail water, which is water leaving each of the plurality of pipes 7.

Figure 1:
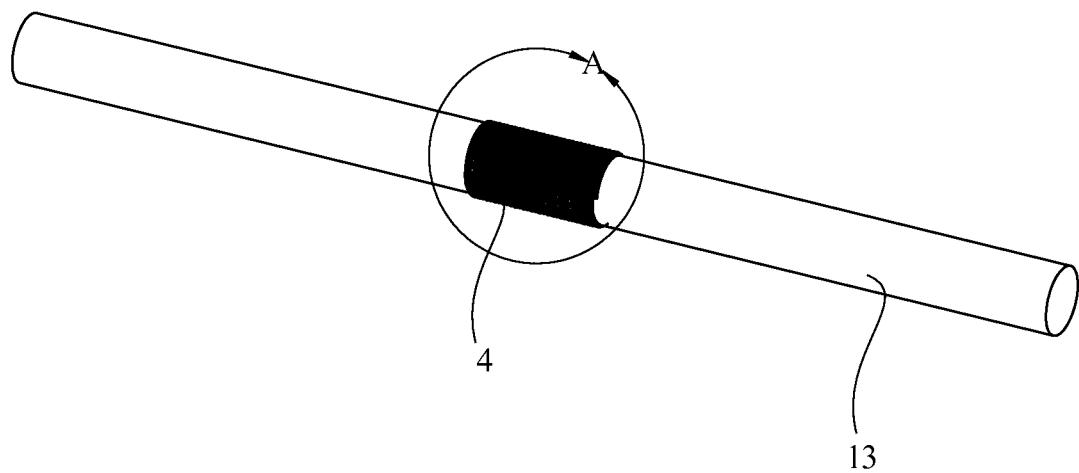
FIG. 1 is a perspective view of a wheel axle with a metal coil.

In reference to FIG. 1, FIG. 2, and FIG. 4, to generate electricity, a metal coil 4, which helically encircles the wheel axle 13, must rotate within the electromagnetic layer 9 that surrounds each of the plurality of chambers 8 while the wheel axle 13 stays stationary in the pipe hole 10. Furthermore, the metal coil 4 is also positioned centered on the wheel axle 13. The wheel axle 13 is aligned with the pipe hole 10. Specifically, the wheel axle 13 is attached on both ends within each of the plurality of chambers 8. Through the rotation of each of the plurality of water wheels 1 and the wheel axle 13, the metal coil 4 will spin in the same direction as a result. The method of rotating the metal coil 4 within the electromagnetic layer 9 is modeled after the theory behind solenoids. Traditionally, when using solenoids to generate electricity, the magnet is placed inside of the metal coil 4 and is moved up and down the metal coil 4 to generate the current needed. In the present invention, the design is of an inverted solenoid. The metal coil 4 in the present invention is spinning around the electromagnetic layer 9, which is stationary on the plurality of pipes 7. The current generated from the metal coil 4 can then be transferred out of the plurality of pipes 7 through wires which are protected in the wire housing 12. Eventually, the current will be stored in the energy storage device 14, which can include, but is not limited to, a battery. In the present invention, the energy storage device 14 may be connected to each of the plurality of pipes 7 or all of the plurality of pipes 7. Particularly, each of the plurality of chambers 8 may have its own energy storage device 14 or all of the plurality of chambers 8 may have a communal energy storage device 14. As illustrated in FIG. 6, the wire housing 12 from each of the plurality of chambers 8 carries the generated electricity from the metal coil 4 to the energy storage device 14. The constant inflow and outflow of water will ensure that the plurality of water wheels 1 spins continuously until the source of water is manually shut off by the owner or the electromagnetic layer 9 is disabled. The set up of the present invention is opposite from the traditional set up of many hydroelectric power generators currently in use. In traditional hydroelectric power generators, a stator is a series of coiled wires and a rotor are electromagnets which rotate to create a time varying electromagnetic field. In the present invention, however, the electromagnets of the electromagnetic layer 9 are the stator and each of the plurality of water wheels 1 and the metal coil 4 are the rotor.

Referring to FIG. 1 and FIG. 6, once electricity has been generated from the rotations of the metal coil 4 within the magnetic field of the electromagnetic layer 9, the electricity is taken to the energy storage device 14. In the first embodiment and the second embodiment, the energy storage device 14 is a battery. A full wave rectifier is used to convert the alternating current to direct current. The power is then stored in the battery until the power is ready to be consumed. Once the electricity is drawn out of the battery, the electricity is converted back to alternating current through an inverter. Once being released from the battery and converted into an alternating current, the current is able to flow to the rest of the house. The battery acts as both a storage unit and a point of distribution for the electricity. In certain cases such as when the full capacity of the energy storage device 14 has been reached, the entire fluid-driven power generating apparatus can be shut off. By turning off the electromagnetic layer 9, the magnetic field also ceases to exist, which in turn stops the power generation. This is an efficient element of the design because it allows the electronic system to put a halt to the generation of electricity until a sufficient amount of electricity has been used from the battery. Essentially, the present invention can be self operated electronically, and does not require any actions from the user. Extra power storage can be increased by an owner of a building for economic reasons.

As for the first embodiment and the second embodiment, the majority of the infrastructure of a house will not need to be changed, as the electrical wiring and the infrastructure are built for the use of alternating current. The plumbing system is the only major system in need of an overhaul. This makes the first embodiment and the second embodiment of the present invention accessible to home owners of varying incomes and floor plans because the first embodiment and the second embodiment do not require a full renovation or reconstruction of a house. Homeowners would also be able to slowly incorporate the first embodiment and the second embodiment into their home by gradually switching out traditional pipes over a prolonged period of time. An objective of the present invention is to increase energy efficient practices by implementing a product that can decrease the waste of electricity. Even changing half of the original pipes in the house can prove to be useful. In the long term, the overall reduction in energy and electricity costs will pay for the installation of the first embodiment and the second embodiment of the present invention. Moreover, the first embodiment and the second embodiment of the present invention would reduce if not eliminate the carbon footprint generated by the house.

As an added feature, the first embodiment and the second embodiment of the present invention can also be used in conjunction with a water recycler. The recommended use of water recyclers is due to an increase in number of pipes utilized and an urgent need to preserve water. With the pressing need to develop better methods of reusing natural resources, water recyclers were created to essentially recycle grey water, black water, and white water. Black water is the water that often originates from waste related water uses, such as the toilet. However, grey water is wastewater that is generated from domestic uses of water, such as laundry, bathing, etc. Finally, white water is essentially freshwater—the cleanest form of water available for a household. Common water recyclers are able to treat grey water to the point where grey water is safe enough to use for toilets and such. Black water can be recycled or cleaned to be used in sprinkler and irrigation systems, which is beneficial for plants. Furthermore, the recycling of black water may help in restoring ground water while decreasing the need of sewer systems. The versatility the first embodiment and the second embodiment of the present invention allows the home owner to take a step further into becoming more environmentally conscious. The plurality of pipes 7 alone are sufficient for considerable energy savings, but having an attached water recycler will help create better use of waste water.

Figure 14:
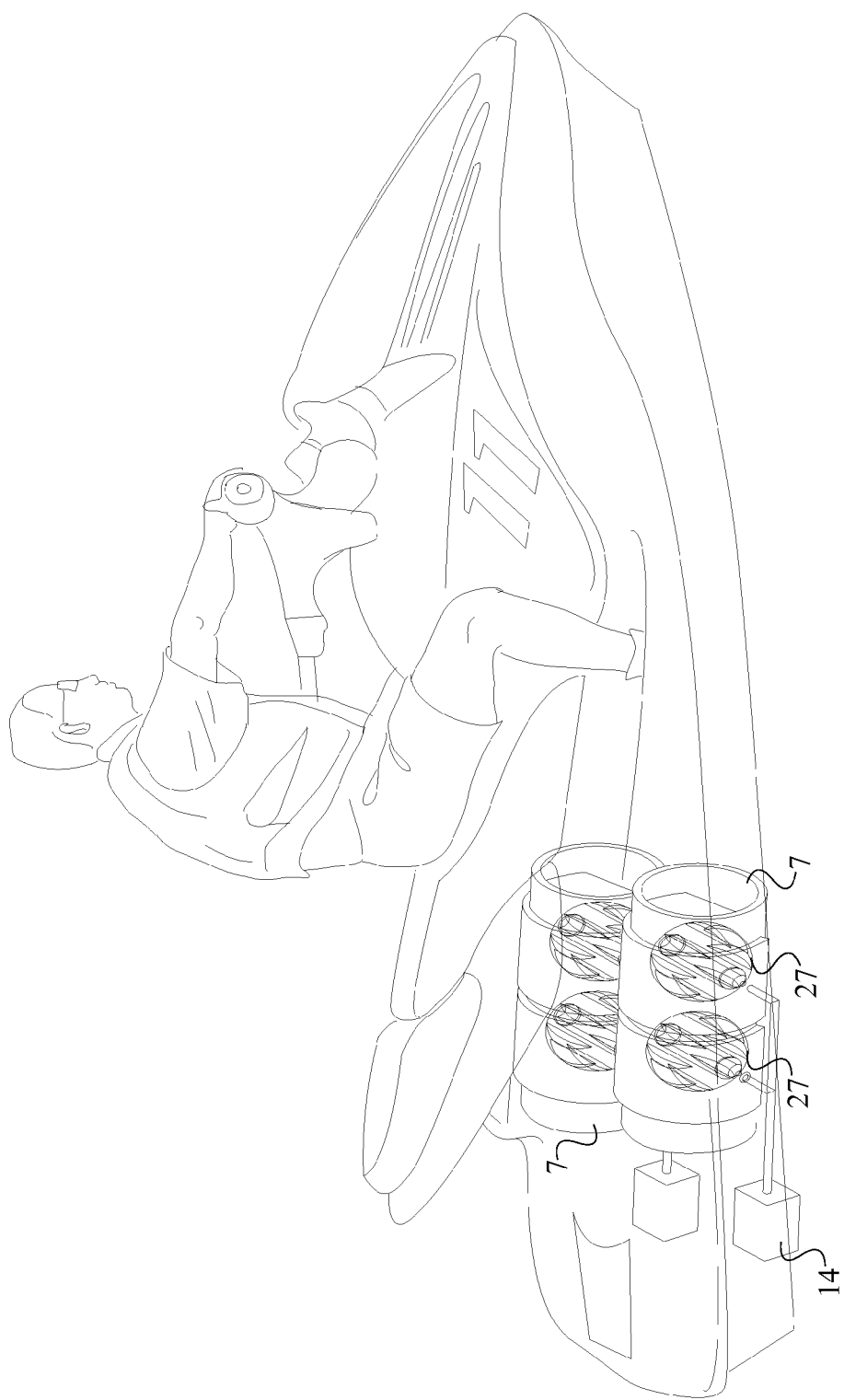
FIG. 14 is a functional view of the second embodiment of the present invention.

Finally, the first embodiment and the second embodiment of the present invention could be used in other settings outside of individual households and its scope is not limited to individual households. The present invention may be incorporated into any building or structure that has a water flow such as a corporate building with integrated plumbing such as pipelines, flushing toilets, sinks, showers and other water flow devices. Examples of a corporate building include a hospital, a hotel, a school, an office building and the like. Furthermore, the first embodiment and the second embodiment are versatile because both of the embodiments can be shrunk in size to be incorporated into any device with a constant flow of water. One example of a situation where the first embodiment and the second embodiment could generate valuable supplementary energy is on water based vessels such as jet skis, boats and submarines as shown in FIG. 14. While traveling along the water, the passing water would spin the plurality of water wheels 1 or the plurality of balls 27 to generate electricity. This electricity can then be used to power the engine on the water vehicle or stored in a battery. With the energy renewal technology in the present invention, the water vehicle may not need to be refueled as the water vehicle may comprise tubes that house the plurality of water wheels 1 or a plurality of propellers that self-powered. Without an onboard engine, these water vehicles would be lighter, faster as well as quieter. The water streaming through the tubes of the water vehicle may help stabilize the water craft so the water craft is less likely to topple over. As for a submarine, these tubes comprising the plurality of water wheels 1 may be positioned on the outer lateral surface of the submarine. The present invention would greatly reduce the energy costs associated with powering water vehicles and thus provide an environmentally friendly method to power water vehicles.

Figure 7:
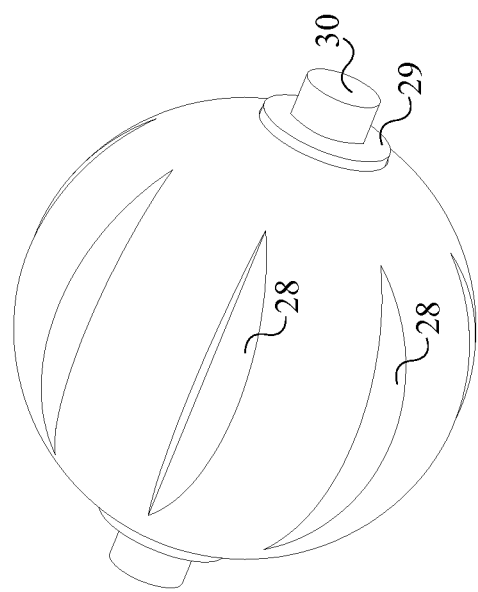
FIG. 7 is a perspective view of each of a plurality of balls with circumferential indents shown.
Figure 8:
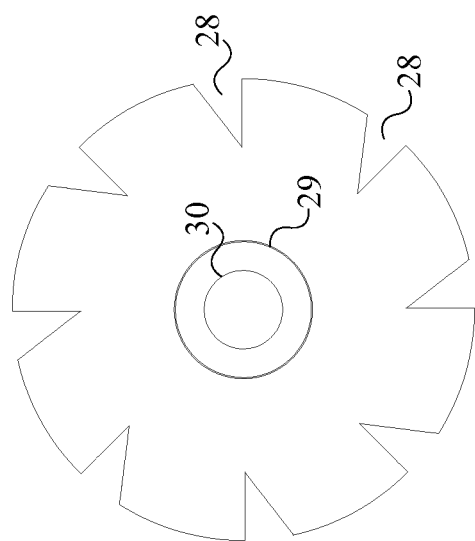
FIG. 8 is a lateral view of each of the plurality of balls with circumferential indents shown.

As mentioned previously, the second embodiment and the third embodiment are similar to the first embodiment in that both the second embodiment and the third embodiment utilize electromagnetism to generate electricity. The second embodiment is similar to the first embodiment in that the second embodiment comprises the plurality of balls 27 instead of the plurality of water wheels 1. The plurality of balls 27 are also present in the third embodiment, whose specifications will be described hereinafter. Similar to each of the plurality of water wheels 1, each of the plurality of balls 27 comprises the plurality of indents 28, a ball center hole 29, and a ball axle 30 as shown in FIG. 7 and FIG. 8. The plurality of indents 28 are circumferentially positioned on each of the plurality of balls 27. Furthermore, the plurality of indents 28 are evenly distributed around the circumference of each of the plurality of balls 27. The circumferential position of the plurality of indents 28 allows the plurality of indents 28 to be exposed to the inflow of fluid so each of the plurality of balls 27 may then be rotated in the direction of the flowing fluid. The plurality of indents 28 serves the same function as the plurality of wheel paddles 2 of the first embodiment. Similar to the plurality of water wheels 1, each of the plurality of balls 27 rotates about the ball axle 30, which traverses through the ball center hole 29 located centrally on each of the plurality of balls 27. Similar to the wheel axle 13, the ball axle 30 is also stationary in the pipe hole 10. The ball center hole 29 centrally traverses through each of the plurality of balls 27. Therefore, the ball axle 30 attached thereto is also centrally traversing through each of the plurality of balls 27. Furthermore, the ball axle 30 also comprises a metal coil 4 similar to the wheel axle 13 of the first embodiment in FIG. 1. Similar to the first embodiment, the metal coil 4 also helically encircles the ball axle 30 at the centered portion thereof. Therefore, the metal coil 4 is positioned centered on the ball axle 30. The centered position of the metal coil 4 allows the metal coil 4 to interact effectively with the magnetic field produced by the electromagnetic layer.

Unlike the first embodiment and the second embodiment, which are both open system apparatuses, the third embodiment is a closed system apparatus. Specifically, the third embodiment is a closed system fluid-driven power generating apparatus. The third embodiment comprises the mercury core 16, which is radially connected to the plurality of pipes 7. The plurality of pipes 7 can be replaceable from the mercury core 16 as a circular flange 32 of each of the plurality of pipes 7 is attached to the mercury core 16 via a bolt 33 as shown in FIG. 12. Located at the end of each of the plurality of pipes 7 is the circular flange 32 which serves as an attachment platform for the bolt 33 to attach each end of the plurality of pipes 7 to the mercury core 16. Additionally, each end of the plurality of pipes 7 comprises a valve 31, which serves to constrict and shut off the flow of liquid mercury 23 in each of the plurality of pipes 7 in case the pipe required maintenance. During maintenance, the valve 31 is utilized to shut off the inflow of liquid mercury 23 from the mercury core 16 to each of the plurality of pipes 7. The bolt 33 is then unfastened from the circular flange 32 so each of the plurality of pipes 7 can be removed, cleaned or replaced. The plurality of pipes 7 comprises a plurality of input pipes 24 and a plurality of output pipes 25. As shown in FIG. 11, the plurality of input pipes 24 are indicated with arrows pointing toward the mercury core 16 and the plurality of output pipes 25 are indicated with arrows pointing away from the mercury core 16. The plurality of input pipes 24 carry the liquid mercury 23 back to the mercury core 16, whereas the plurality of output pipes 25 carry the liquid mercury 23 away from the mercury core 16. Since the third embodiment is a closed system, the liquid mercury 23 is constantly circulated throughout the apparatus via the plurality of input pipes 24, the plurality of output pipes 25, and the mercury core 16. The closed system fluid-driven power generating apparatus is ideal for ships, submarines, aircrafts, and spacecrafts that require additional power should the on-board power be depleted. In a ship, maximum efficiency is reached when the third embodiment is wrapped and convoluted around a hall of the ship. The closed system fluid-driven power generating apparatus is especially appropriate for spacecrafts since spacecrafts require a reliable power source to power on-board electronics and equipment. A closed system, power generating liquid mercury 23 apparatus is also a suitable power supply for places where water is not readily available such as aircrafts, spacecrafts, or any other place a closed system without water is needed for power. This liquid mercury 23 variation of a closed power system may induce a magnetic field. If the magnetic field produced is large enough, the magnetic field could potentially behave like a force field and induce artificial gravity.

Similar to the first embodiment and the second embodiment, each of the plurality of pipes 7 comprises the plurality of balls 27, the energy storage device 14, and the electromagnetic layer 9. Each of the plurality of balls 27 comprises a pipe hole 10, a threaded corked screw 11, a wire housing 12, and a ball guard 26 as shown in FIG. 11, FIG. 12, and FIG. 13. The arrangement of all the aforementioned components in the third embodiment is also similar to the arrangement of the same components in both the first embodiment and the second embodiment. The magnetic field produced in the third embodiment is also due to an attachment of the electromagnetic layer 9 upon each of the plurality of pipes 7. As illustrated in FIG. 11, the electromagnetic layer 9 completely sheathes each of the plurality of pipes 7 to produce pipes with even lateral surfaces and even circumferential edges. Unlike water pipes in the first embodiment and the second embodiment, the dimensions of the mercury pipes in the third embodiment may be standardized to replace standard pipes. All standard pipes have even lateral surfaces and even circumferential edges. Traversing through each of the plurality of balls 27 is the pipe hole 10, which the ball axle 30 is attached thereto. Specifically, the ball axle 30 is aligned with the pipe hole 10, inside each of the plurality of pipes 7. Furthermore, the ball axle 30 is attached on both ends to the inside of each of the plurality of pipes 7. Through the attachment of the ball axle 30 to the pipe hole 10, each of the plurality of balls 27 can be supported within each of the plurality of pipes 7. The plurality of balls 27 is situated within each of the plurality of pipes 7 in such a manner that the circumferential edge of each of the plurality of the balls does not come in contact with the inner cylindrical edge of plurality of pipes 7. Therefore, the plurality of balls 27 will not block the flow of fluid within the plurality of pipes 7.

In order for the electricity generated to be stored in the energy storage device 14, the electricity produced by the metal coil 4 and the electromagnetic layer 9 has to be led back out of each of the plurality of pipes 7 and to the energy storage device 14 as shown. The wires connecting the metal coil 4 to the energy storage device 14 are safely sheathed by the wire housing 12, which also traverses through the pipe hole 10. Furthermore, the wire housing 12 connects the energy storage device 14 to each of the plurality of pipes 7. To prevent the liquid mercury 23 from leaking out of the pipe hole 10, the pipe hole 10 has been insulated by the threaded corked screw 11. As illustrated in FIG. 11, the threaded corked screw 11 encircles the wire housing 12 while being positioned inside the pipe hole 10. Therefore, the threaded corked screw 11 is positioned on the wire housing 12 at the pipe interface.

Along with the plurality of balls 27 inside each of the plurality of pipes 7, there is the ball guard 26 positioned adjacent to each of the plurality of balls 27 as shown in FIG. 12 and FIG. 13. Similar to the wheel guard 6, the ball guard 26 serves a flow constrictor to suppress the inflow fluid before the inflow fluid contacts each of the plurality of balls 27. In constricting the inflow fluid, the subsequent fluid pressure hitting each of the plurality of balls 27 is greater than if there were no ball guards present. With greater fluid pressure hitting the plurality of balls 27, the plurality of balls 27 is spun at a faster rate, producing more electric power in the process. The ball guard 26 is positioned perpendicularly within each of the plurality of pipes 7. Specifically, the ball guard 26 is positioned perpendicularly to the inflow of fluid, before each of the plurality of balls 27. As illustrated in FIG. 12 and FIG. 13, the ball guard 26 in both the plurality of input pipes 24 and the plurality of output pipes 25 is positioned perpendicularly to the inflow of the fluid before the flow of the fluid comes in contact with each of the plurality of balls 27. In the plurality of input pipes 24, each of the plurality of balls 27 is situated in between the ball guard 26 and the mercury core 16. In the plurality of output pipes 25, the ball guard 26 is situated in between the mercury core 16 and each of the plurality of balls 27.

In the closed system of the third embodiment of the present invention, the circulation of the liquid mercury 23 throughout the plurality of pipes 7 including both the plurality of input pipes 24 and the plurality of output pipes 25 is made possible by an attachment of the oscillator to the mercury core 16. The oscillator is centrally positioned in the mercury core 16. Therefore, the oscillator is completely immersed in liquid mercury 23 within the mercury core 16. As shown in FIG. 12 and FIG. 13, the oscillator comprises a plurality of blades 19 and an oscillator core 18. The plurality of blades 19 is radially connected to the oscillator core 18. In the preferred embodiment, the oscillator is cylindrically-shaped with the plurality of blades 19 radially protruding from the oscillator core 18 thereof. Specifically, the plurality of blades 19 are parallel to the length of the oscillator core 18. Various shapes of the oscillator include but are not limited to wheel-shaped or ball-shaped oscillators. The oscillator functions as a rotatable circulator whose rotations are powered by the closed system itself and by an external power source such as a battery. Due to the parallel relationship of the plurality of blades 19 to length of the oscillator core 18, the rotations of the oscillator will rotate the plurality of blades 19, which also rotates and pushes the liquid mercury 23 into the plurality of output pipes 25. The liquid mercury 23 eventually circulates back to the mercury core 16 through the plurality of input pipes 24. Once in the mercury core 16, the liquid mercury 23 is led back into the plurality of output pipes 25 to begin another cycle. Liquid mercury has been chosen for the closed system fluid-driven power generating apparatus due to liquid mercury possessing a greater density than water. Due to liquid mercury's higher density, liquid mercury 23 thus hits the plurality of balls 27 and the plurality of blades 19 with a greater force, which results in a higher power production. As the liquid mercury 23 flows under the electromagnetic layer 9 of the plurality of pipes 7, the liquid mercury 23 produces extra electricity as mercury is a highly conductive metal.

The oscillator core 18 of the third embodiment may be a magnetic oscillator core 18 or a nuclear oscillator core 18. If the magnetic oscillator core 18 had been implemented in the third embodiment, the oscillator core 18 would have a metal coil 4 surrounding the magnetic oscillator core 18 to yield additional electricity to the closed system. If the nuclear oscillator core 18 had been implemented in the third embodiment, the nuclear oscillator would be connected to a nuclear reactor which produces energy to power the oscillator in addition to other components on the ship. Additionally, the nuclear oscillator core 18 may be connected to a portable nuclear reactor, which also produces energy to power the oscillator and other components on the ship. In the preferred embodiment, the oscillator is operatively coupled to a push button switch 20 and a starter energy storage device 21 such as a battery. The starter energy storage device 21 provides the oscillator the initial energy to rotate the oscillator. The push button switch 20 is only temporarily activated until the oscillator is powered by the apparatus itself. The oscillator may be able to operate on its own after the provided initial force due to the oscillator being additionally coupled to a toggle switch 22 and the energy storage device 14 connected to one of the plurality of the pipes. The toggle switch 22 must be activated prior to the user activating the oscillator since an activated toggle switch 22 will allow generated electricity from the energy storage device 14 to be led back to the oscillator to power the oscillator. With the oscillator being powered by the energy storage device 14 from one of the plurality of pipes 7, the oscillator and the entire closed system is thus self-sustaining. In order to shut down the oscillator and thus the entire closed system, the user may turn off the toggle switch 22, whose deactivation in turn will disconnect the electrical connection between the energy storage device 14 and the oscillator. Thus, the entire closed system will be shut off.

Although the invention has been explained in relation to its preferred embodiment, it is to be understood that many other possible modifications and variations can be made without departing from the spirit and scope of the invention as hereinafter claimed.

What is claimed is:

1. A fluid-driven power generating apparatus comprises,
a mercury core;
a plurality of pipes;
a plurality of balls;
each of the plurality of balls comprising a plurality of indents, a ball center hole, a pipe hole, a threaded corked screw, a wire housing, a ball guard, and a ball axle;
the plurality of indents being positioned circumferentially on each of the plurality of balls;
the ball center hole centrally traversing through each of the plurality of the balls;
the ball axle traversing through the ball center hole;
the ball axle comprises a metal coil;
the metal coil helically encircling the ball axle;
the metal coil being centered on the ball axle;
the ball guard being perpendicularly positioned within each of the plurality of pipes;
an energy storage device;
the mercury core comprising an oscillator;
the mercury core comprising a liquid mercury;
the oscillator comprising a plurality of blades and an oscillator core;
the plurality of pipes being radially connected to the mercury core;
the plurality of balls being positioned within each of the plurality of pipes;
each of the plurality of pipes being connected to the energy storage device;
the pipe hole traversing laterally through each of the plurality of balls;
the ball axle being aligned with the pipe hole;
the wire housing traversing through the pipe hole;
the threaded corked screw being positioned on the wire housing;
the ball axle being attached on both ends within each of the plurality of the pipes; and
the energy storage device being connected to the wire housing.

2. The fluid-driven power generating apparatus as claimed in claim 1, wherein the oscillator is operatively coupled to a toggle switch and the energy storage device.

3. The fluid-driven power generating apparatus as claimed in claim 1, wherein the oscillator is operatively coupled to a push button switch and a starter energy storage device.

4. The fluid-driven power generating apparatus as claimed in claim 1, wherein the oscillator core can be a nuclear oscillator core.

5. The fluid-driven power generating apparatus as claimed in claim 1, wherein the oscillator core can be a magnetic oscillator core.

6. The fluid-driven power generating apparatus as claimed in claim 1 comprises,
the plurality of pipes comprising a plurality of input pipes and a plurality of output pipes;
each of the plurality of pipes comprising an electromagnetic layer;
each of the plurality of pipes comprising a valve, a circular flange, and a bolt; and
the circular flange of each of the plurality of pipes being attached to the mercury core via the bolt.

7. The fluid-driven power generating apparatus as claimed in claim 6 comprises,
each of the plurality of balls being situated in between the ball guard and the mercury core in the plurality of input pipes; and
the ball guard being situated in between the mercury core and each of the plurality of balls in the plurality of output pipes.

8. The fluid-driven power generating apparatus as claimed in claim 1 comprises,
the oscillator being positioned within the liquid mercury.

9. The fluid-driven power generating apparatus as claimed in claim 1, wherein the oscillator rotates and circulates the liquid mercury within thereof.

* * * * *